United States Patent
De Wulf

(10) Patent No.: US 6,414,450 B1
(45) Date of Patent: Jul. 2, 2002

(54) DISPLAY APPARATUS COMPRISING AN OPTOCOUPLER CIRCUIT

(75) Inventor: Erik Maria Hendrik De Wulf, Brugge (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/828,091

(22) Filed: Apr. 6, 2001

(30) Foreign Application Priority Data

Apr. 28, 2000 (EP) .............................. 00201530

(51) Int. Cl.[7] .................. G05F 1/00; H05B 37/02; H05B 39/04; H05B 41/36; G02B 27/00
(52) U.S. Cl. ....................... 315/291; 250/551
(58) Field of Search .................... 315/291, 8.51, 315/10, 11.5, 5.44, 387–392; 250/551, 205, 214 R; 345/11, 30, 42

(56) References Cited

U.S. PATENT DOCUMENTS

| | | | | |
|---|---|---|---|---|
| 4,992,709 A | * | 2/1991 | Griffin | 318/249 |
| 5,182,456 A | * | 1/1993 | Beezley | 250/551 |
| 6,204,613 B1 | * | 3/2000 | Hesterman | 315/291 |
| 6,192,125 B1 | * | 2/2001 | Norsworthy et al. | 379/399 |
| 6,272,220 B1 | * | 8/2001 | Kincaid | 379/399 |

* cited by examiner

*Primary Examiner*—Don Wong
*Assistant Examiner*—Minh A
(74) *Attorney, Agent, or Firm*—Edward W. Goodman

(57) ABSTRACT

An optocoupler circuit includes a pulse generator which supplies a pulsed signal to the light-emitting device, while the pulsed signal has at least two different levels of which at least one of the levels is controllable. The pulsed signal is a combination of an input pulse signal and an input level signal. The light-emitting device produces an amount of light which depends on the levels of the pulsed signal. The photosensitive device supplies an output signal which depends on the amount of light received from the light-emitting device. A separation circuit receives the output signal and separates an output pulse signal therefrom, indicating an occurrence of a pulse of the input pulse signal, and an output level signal corresponding to a value of the at least one controllable level and thus to the input level signal.

9 Claims, 2 Drawing Sheets

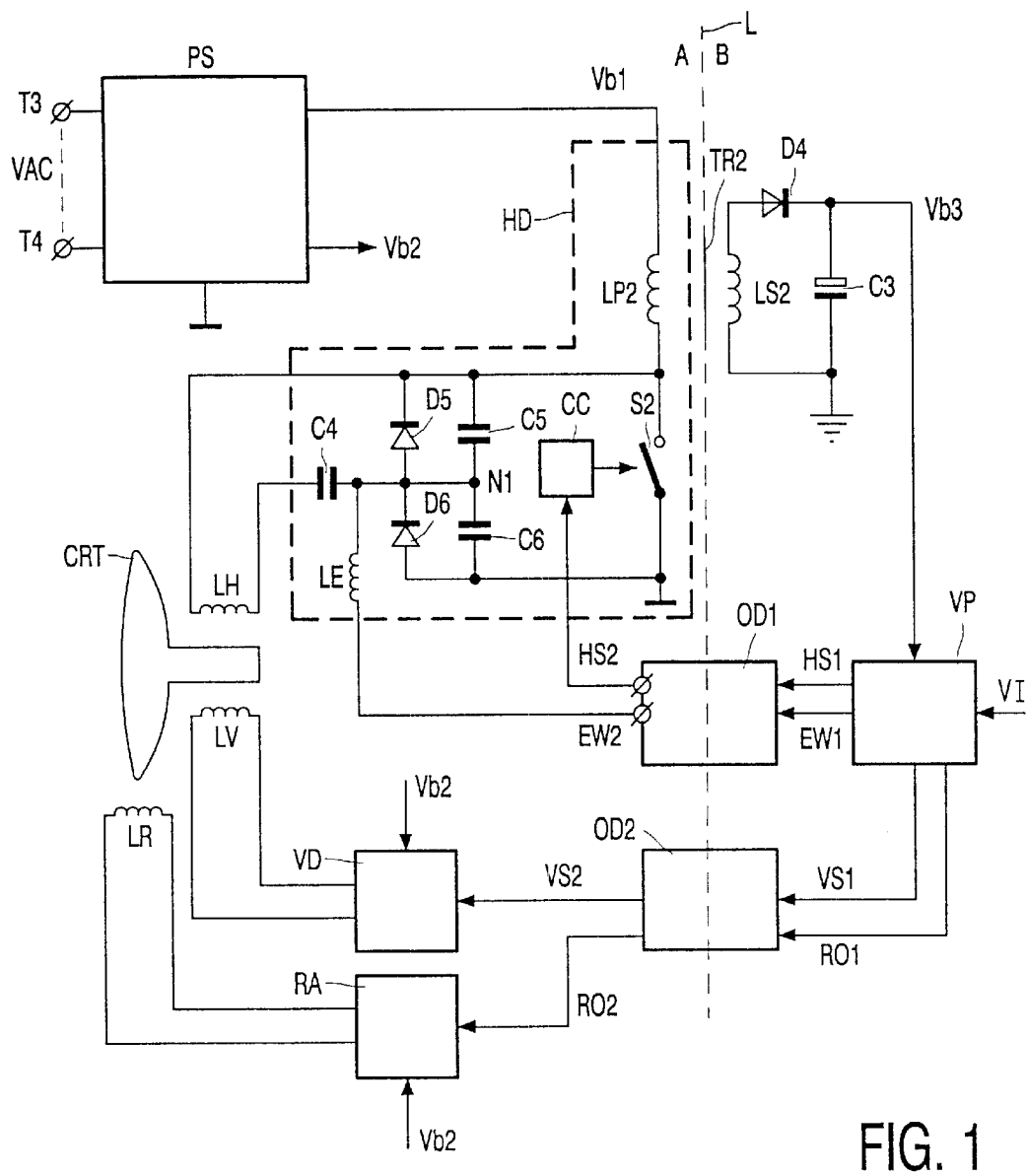
FIG. 1
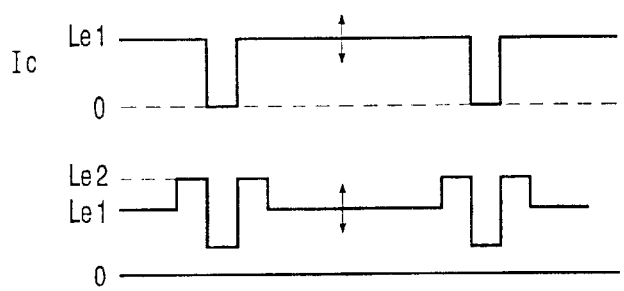
FIG. 4A
FIG. 4B

DISPLAY APPARATUS COMPRISING AN OPTOCOUPLER CIRCUIT

BACKGROUND OF THE INVENTION

1. Field of the Invention

The invention relates to a display apparatus comprising an optocoupler circuit for transporting a signal between a non-line-voltage-insulated part and a line-voltage-insulated part of the display apparatus.

2. Description of the Related Art

Generally known display apparatuses, which comprise a switched-mode power supply to convert the AC line voltage into a stabilized power supply voltage, include an optocoupler between the non-line-voltage-insulated and the line-voltage-insulated part of the power supply. In this way, it is possible to transfer information about the value of the stabilized power supply voltage from the line-voltage-insulated part of the power supply to its non-line-voltage-insulated part to control on- and off-switching of a switch coupled to a primary winding of a transformer of the switched-mode power supply. The stabilized power supply voltage is supplied by a line-voltage-insulated secondary winding of the transformer. Line voltage insulation is required to prevent a hazardous electric shock when a user touches the display apparatus. An optocoupler comprises a light-emitting device and a photosensitive device which is optically coupled to the light-emitting device.

It is known to implement a low-cost non-line-voltage insulated power supply in a cathode ray tube display apparatus and to provide the line-voltage-insulation in the line output transformer (further referred to as LOT). The line deflection circuit is provided with power by the non-line-voltage-insulated power supply via a primary winding of the LOT. A line-voltage-insulated secondary winding of the LOT supplies a power supply voltage to signal processing circuits at the line-voltage-insulated part of the display apparatus. Signals originating from the line-voltage-insulated part and required to control or drive circuits at the non-line-voltage-insulated part cross the line voltage insulation barrier via pulse transformers or optocouplers. For each signal, which has to cross the line voltage insulation barrier, one pulse transformer, or one optocoupler, is used. Pulse transformers are unable to transfer DC signals, and are too bulky and expensive at low-frequent signals, like frame-frequent signals. Optocouplers are expensive.

SUMMARY OF THE INVENTION

It is, inter alia, an object of the invention to decrease a number of optocouplers required for transporting signals across the line voltage insulation barrier.

To this end, a first aspect of the invention provides a display apparatus comprising a non-line-voltage-insulated part; a line-voltage-insulated part; and an optocoupler circuit for transporting a signal between said non-line-voltage-insulated part and said line-voltage-insulated part, the optocoupler circuit comprising an optocoupler having a light-emitting device and a photosensitive device optically coupled to the light-emitting device, characterized in that the optocoupler circuit comprises a pulse generator for supplying a pulse signal having at least two different levels, at least one of said two different levels being controllable, to the light-emitting device; and a separation circuit coupled to the photosensitive device for separating an output pulse signal indicating an occurrence of a pulse, and a level signal corresponding to a value of said at least one controllable level.

The optocoupler circuit comprises a pulse generator for supplying a pulsed signal to the light-emitting device, the pulsed signal having at least two different levels of which at least one of the levels is controllable. The pulsed signal is a combination of an input pulse signal and an input level signal. The light-emitting device produces an amount of light which depends on the levels of the pulsed signal. The photosensitive device supplies an output signal which depends on the amount of light received from the light-emitting device. A separation circuit receives the output signal and separates an output pulse signal therefrom, indicating an occurrence of a pulse of the input pulse signal, and an output level signal corresponding to a value of the at least one controllable level, and thus to the input level signal. If the pulse signal has two different levels, the separation circuit may detect one or both of the transition(s), or one of the levels, to generate the output pulse signal. The separation circuit may detect the value of the controlled level, or may average the output signal if a single level is controlled. The separation circuit may detect the values of both controlled levels, or may average the output signal if both levels are controlled. It is possible to transfer more than two levels.

An embodiment of the invention in which the separation circuit comprises a comparator for comparing an output signal of the photosensitive device with a reference to supply the output pulse signal; and an integrator for integrating said output signal to supply the level signal, provides a simple implementation of the separation circuit.

An embodiment of the invention in which the deflection circuit comprises a frame deflection circuit, the input pulse signal being a frame synchronization signal, and the output pulse signal being supplied to the frame deflection circuit, provides a display apparatus in which the optocoupler transfers both the level signal and the frame synchronization pulses across the line voltage insulation barrier.

An embodiment of the invention in which the deflection circuit comprises a line deflection circuit, the input pulse signal being a line synchronization signal, and the output pulse signal being supplied to the line deflection circuit, provides a display apparatus in which the optocoupler transfers both the level signal and the line synchronization pulses across the line voltage barrier.

An embodiment of the invention in which the pulse generator further receives an input level signal from the signal-processing circuit to control the at least one controllable level to obtain the level signal, the input level signal being a controlled DC value or a waveform, provides a display apparatus in which the level signal is a DC level, for example, for controlling an amount of rotation of the information displayed on a display device of the display apparatus, or a waveform, for example, a geometry correction waveform to correct the line or frame deflection current, or to generate a dynamic focussing voltage. The waveform may be line or frame-periodic.

The display apparatus with the optocoupler circuit in accordance with the invention is able to transfer both a pulse signal and a level signal via a single optocoupler, and thus a number of optocouplers required for transporting signals across the line voltage insulation barrier decreases.

An embodiment of the invention in which the optocoupler circuit has a transfer characteristic form a current through the light-emitting device to a current through the photosensitive device, said transfer characteristic being temperature dependent, wherein said driver circuit comprises an impedance and a current source for supplying a current to a node, both said light-emitting device and said impedance being arranged between said node and a further node, said impedance having a value for decreasing said temperature dependence of said transfer characteristic, provides a temperature-stabilized optocoupler circuit, which decreases the temperature influence on the transfer of the level signal by the optocoupler.

These and other aspects of the invention are apparent from and will be elucidated with reference to the embodiments described hereinafter.

BRIEF DESCRIPTION OF THE DRAWINGS

In the drawings:

FIG. 1 shows a block diagram of an embodiment of a display apparatus in accordance with the invention;

FIGS. 4A and 4B show examples of waveforms which are transferred by the optocoupler.

DESCRIPTION OF THE PREFERRED EMBODIMENTS

Figure 2:
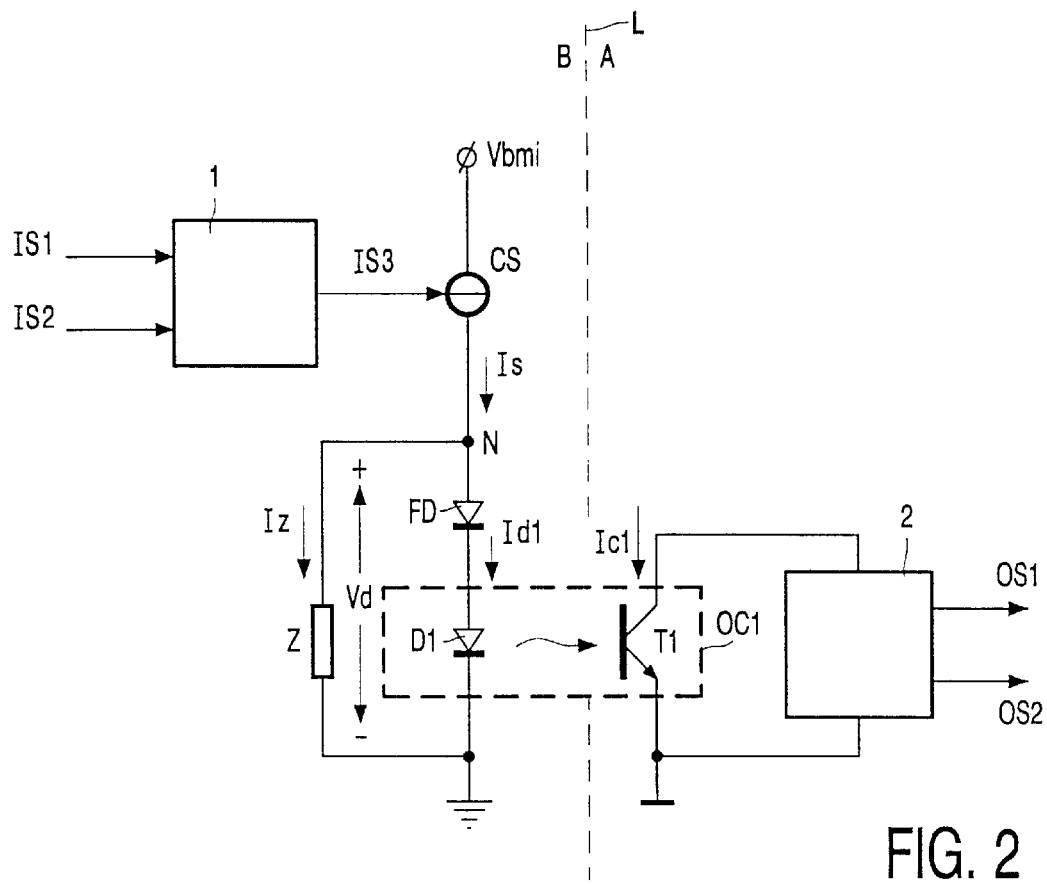
FIG. 2 shows a block diagram of a first embodiment of the optocoupler circuit in accordance with the invention.

FIG. 1 shows a block diagram of an embodiment of a display apparatus in accordance with the invention.

The display apparatus is divided into a line-voltage insulated part which is denoted by B and shown at the right hand side of the vertical dashed line L, and a non-line-voltage-insulated part which is denoted by A and shown at the left hand side of the line L. The line-voltage-insulated part B of the display apparatus comprises a signal processor VP which may comprise a video signal processor and a synchronization processor, a secondary winding LS2 of the line output transformer TR2 (further referred to as LOT) and the line-voltage-insulated part of the optocoupler circuits OD1 and OD2. The non-line-voltage-insulated part A of the display apparatus comprises the non-line-voltage insulated part of the optocoupler driver circuits OD1 and OD2, a line deflection circuit HD, a frame deflection circuit VD, the line and frame deflection coils LH and LV , a cathode ray tube CRT, an optional rotation coil LR, an optional rotation coil drive circuit RA, and a non-line-voltage-insulated line voltage power supply PS to supply power to the deflection circuits HD, VD and the rotation drive circuit RA. The line deflection circuit HD comprises the primary winding LP2 of the LOT.

The power supply PS comprises input terminals T3 and T4 to receive the AC line voltage Vac, a first output supplying a power supply voltage Vb1 to the primary winding LP2, and a second output supplying a power supply voltage Vb2 to the frame deflection circuit VD and the rotation drive circuit RA. The topology of the power supply PS is not relevant to the invention. Any of the well-known non-line-voltage-insulated power supply topologies which are able to supply at least two power supply voltages Vb1 and Vb2 can be used. For example, the power supply PS may be a down-converter wherein a secondary winding of a non-line-voltage-insulated transformer supplies the power supply voltage Vb2.

The other end of the primary winding LP2 is connected to non-line-voltage-insulated ground via a switching element S2 which is controlled by a control circuit CC in response to a line synchronizing signal HS2. The optocoupler circuit OD1 receives the line-voltage-insulated line synchronizing signal HS1 of the video signal VI to be displayed from the signal processor VP and supplies the non-line-voltage-insulated synchronizing signal HS2. A series arrangement of capacitors C5 and C6 is arranged in parallel with the switch S2, while a junction of the series arrangement is denoted by N1. A diode D5 is arranged in parallel with the capacitor C5 with its anode connected to the node N1. A diode D6 is arranged in parallel with the capacitor C6 with its cathode connected to the node N1. A series arrangement of the line deflection coil LH and an S-correction capacitor C4 is arranged in parallel with the diode D5. An East-West modulation coil LE is connected between the node N1 and the non-line-voltage-insulated part of the optocoupler driver circuit OD1 to receive the output East-West signal EW2 which is a substantially parabola-shaped frame-frequent periodical waveform. The optocoupler circuit OD1 receives the line-voltage-insulated line East-West signal EW1 from the signal processor VP and supplies the non-line-voltage-insulated East-West signal EW2. Although the line deflection circuit HD is shown to be a simplified well-known diode modulator, other topologies may also be implemented, wherein a LOT is used which has line voltage insulation between its primary winding LP2 and its secondary winding LS2.

The frame deflection circuit VD receives a frame synchronization signal VS2 from the non-line-voltage-insulated part of the optocoupler OD2, and the power supply voltage Vb2, to supply a frame deflection current through the frame deflection coil LV. The optocoupler circuit OD2 receives the line-voltage-insulated frame synchronization signal VS1 from the signal processor VP and supplies the non-line-voltage-insulated synchronization signal VS2.

The secondary winding LS2 supplies a power supply voltage Vb3 to the video processor VP via the diode D4. A smoothing capacitor C3 is connected in parallel with a series arrangement of the secondary winding LS2 and the diode D4.

The optocoupler circuit OD2 receives the line-voltage-insulated controllable DC level RO1 from the signal processor VP and supplies the non-line-voltage-insulated controllable DC level RO2 to the rotation coil drive circuit RA.

The signal RO1 may also be a signal determining, for example, the frame deflection current, the frame amplitude, or a frame geometry correction waveform. In the last-mentioned situation, the signal RO2 has to be supplied to the frame deflection circuit VD.

FIG. 2 shows a block diagram of a first embodiment of the optocoupler circuit in accordance with the invention.

An optocoupler OC1 comprises a photosensitive or light-sensitive device T1, and a series arrangement of a diode FD and a light-emitting device D1. In FIG. 2, the light-emitting device D1 is a light-emitting diode, and the light-sensitive device T1 is a transistor. A controllable current source CS supplies a current Is having a value controlled by a control signal IS3. The pulse generator 1 receives an input pulse signal IS1 and an input level signal IS2 to generate the control signal IS3. The input pulse signal IS1 defines the pulse by the instant an edge occurs, or by the duration of a predetermined level. The input level signal IS2 may be controlled DC level, or a waveform. The control signal IS3 is a pulsed signal with at least two levels, while a value of at least one of the levels is controlled to vary. Examples of a control signal IS3 are shown in FIGS. 4A and 4B.

For ease of explanation, it is assumed that the current source CS is substantially temperature-compensated. Consequently, the current Is, of which the value depends on the control signal IS3, is substantially constant in the temperature range wherein the optocoupler circuit is used. In consumer applications, this range covers about 0 to 65 degrees centigrade, but other ranges may be required, dependent on the application. Such a controllable temperature-compensated current source is well-known from Integrated Circuits (ICs) and is therefor not further described. The at least two levels may be generated in a well-known manner with a digital-to-analog converter. However, it is not essential for the invention that the current source CS is substantially temperature-compensated but if a very good temperature compensation is required, the impedance Z, of which the function will be elucidated below, might otherwise become more complicated.

The current source CS is arranged between a power supply voltage Vbmi and a node denoted by N. The current Is flows towards the node N. The series arrangement of the diode FD and the light-emitting diode D1 is connected between the nodes N and FN. Both the anodes of the diode FD and the diode D1 are directed towards the node N. The impedance Z is connected in parallel with the series arrangement of the diodes D1 and FD.

An amount of light produced by the diodes D1 depends on the current Id1 flowing through the diode D1. The optocoupler transistor T1 has a conductivity depending on the amount of light received from the diode D1. The light received by the transistor T1 may be converted into an output signal in many ways. By way of example, and not shown in FIG. 2, a resistor may be arranged between a terminal of the transistor T1 and a positive power supply voltage, and the other terminal of the transistor T1 may be connected to ground. In this way, a current Ic1 flows in the transistor T1 which depends on the amount of light collected. An operational amplifier may sense the voltage at the terminal connected to the resistor. A separation circuit 2 separates the pulsed signal produced by the optocoupler transistor T1 in the resistor into the output pulse signal OS1 and the output level signal OS2. The output pulse signal OS1 is a reproduction of the input pulse signal IS1, and output level signal OS2 is a reproduction of the input level signal IS2. The output pulse signal OS1 may be generated by detecting edges or a predetermined level in the signal supplied by the transistor T1. The output level signal OS2 may be generated by sampling another predetermined level, by using an analog-to-digital converter, or by integrating or averaging the signal supplied by the transistor T1.

The circuit shown in FIG. 2 operates in the following way. If the current source CS is substantially temperature-compensated, sufficient temperature compensation may be reached if the value of the impedance Z is substantially constant in the temperature range involved. This is especially the case if the transfer characteristic of the optocoupler OC1 varies linearly with the temperature in the temperature range involved. The current Is splits into a current Id through the series arrangement of the diodes D1 and FD, and a current Iz through the impedance Z. The ratio of the currents Ic1 and Id1 decreases if the temperature increases. Also, the voltage Vd across the series arrangement of the diodes D1 and FD decreases if the temperature increases. The decrease of the voltage Vd causes the current Iz through the impedance Z to decrease. Since the current Is supplied by the current source CS is independent of the temperature, the current Id1 through the diode D1 increases and counteracts the decreasing ratio of the currents Ic1 and Id1.

In a practical implementation, wherein the impedance Z is a resistor arranged in parallel with a series arrangement of the diode D1 and one extra diode FD, the component values are:

Z=820 ohms,
Is=3 milliamperes
wherein the temperature dependence of the ratio is Ic/Id= 10/45 per degree centigrade.
the temperature dependence of each diode D1 and FD is −2 millivolts per degree centigrade, and
the voltage Vd across the diode D of the optocoupler is about IV for a TCDT1102G opto coupler from Temic or Vishay Telefunken.

If the optocoupler circuit of FIG. 2 is implemented in the display circuit of FIG. 1 as the optocoupler circuit OD1, the input pulse signal IS1 corresponds to HS1, the input level signal IS2 corresponds to EW1, the output pulse signal OS1 corresponds to HS2, and the output level signal OS2 corresponds to EW2.

If the optocoupler circuit of FIG. 2 is implemented in the display circuit of FIG. 1 as the optocoupler circuit OD2, the input pulse signal IS1 corresponds to VSI, the input level signal IS2 corresponds to RO1, the output pulse signal OS1 corresponds to VS2, and the output level signal OS2 corresponds to RO2.

The diode FD and the impedance Z provide an improved temperature behavior of the optocoupler circuit and are optional.

Figure 3:
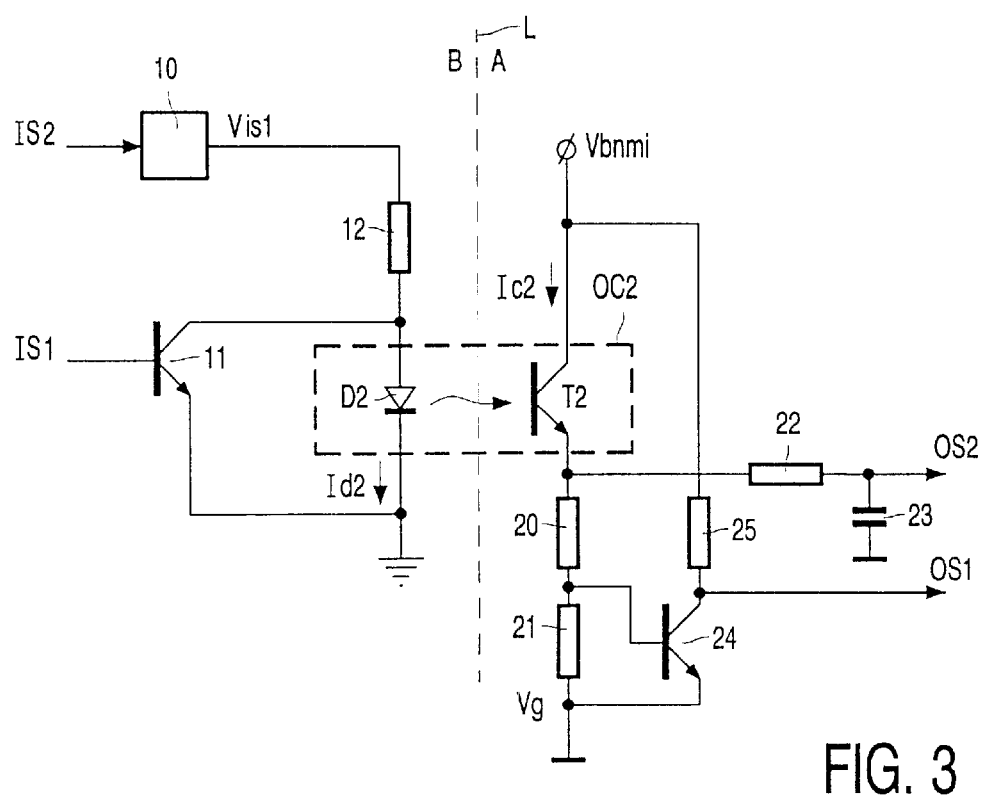
FIG. 3 shows a block diagram of a\ second embodiment of the optocoupler circuit in accordance with the invention.

FIG. 3 shows a block diagram of a second embodiment of the optocoupler circuit in accordance with the invention.

An optocoupler OC2 comprises a photosensitive or light-sensitive device T2, and a light-emitting device D2. In FIG. 3 the light-emitting device D2 is a light-emitting diode, and the light-sensitive device T2 is a transistor. The level-generating circuit 10 receives an input level signal IS2 and supplies a voltage level Vis1 via a resistor 12 to the anode of the diode D2. The input level signal IS2 may be a controlled DC level, or an adjustable waveform. A transistor 11 has a control input receiving an input pulse signal IS1, and a main current path arranged in parallel with the diode D2. A high level of the input pulse signal IS1 causes a zero current (or a low current when an impedance is arranged in series with the main current path of the transistor 11) through the diode D2, the current being substantially independent of the input level signal IS2. A low level of the input pulse signal IS1 causes the transistor 11 to be turned off, and, consequently, a current Id2 flows through the diode D2, this current varying in accordance with the voltage level Vis1. Thus, the pulsed signal Id2 has two levels, a low level representing the pulse signal IS1 when the transistor 11 conducts, and a high level of which a value varies in accordance with the input level signal IS2 when the transistor 11 does not conduct. Examples of the pulse signal Id2 are shown in FIGS. 4A and 4B.

An amount of light produced by the diode D2 depends on the current Id2 flowing through the diode D2. The optocoupler transistor T2 has a conductivity depending on the amount of light received from the diode D2. A series arrangement of two resistors 20 and 21 is arranged between a terminal of the transistor T2 and ground, and the other terminal of the transistor T2 is connected to a positive power supply voltage Vbnmi. A voltage across the resistors 20 and 21 depends on the current Ic2 flowing through the transistor T2 and thus on an amount of light collected by the transistor T2.

A transistor 24 has a base connected to the junction of the resistors 20 and 21, an emitter connected to ground and a collector connected to the power supply voltage Vbnmi via a resistor 25. The output pulse signal OS1 is available at the collector of the transistor 24. The transistor 24 operates as comparator: the output pulse signal OS1 has a fixed high level if the voltage across the resistor 21 is low (transistor 11 does not conduct), and the output pulse signal OS1 has a fixed low level if the voltage across the resistor 21 is high (transistor 11 conducts). The output pulse signal OS1 is a reproduction of the input pulse signal IS1.

A first end of a resistor 22 is connected to the junction of the resistor 20 and the transistor T2. The other end of the resistor 20 is connected to ground via a capacitor 23. The voltage across the series arrangement of the resistors 20 and 21 is averaged by the integrator circuit, comprising the resistor 22 and the capacitor 23. The output level signal OS2 is available across the capacitor 23. The output level signal OS2, which is the averaged pulsed signal, varies in accordance with the input level signal IS2.

If the optocoupler circuit of FIG. 3 is implemented in the display circuit of FIG. 1 as the optocoupler circuit OD1, the input pulse signal IS1 corresponds to HS1, the input level signal IS2 corresponds to EW1, the output pulse signal OS1 corresponds to HS2, and the output level signal OS2 corresponds to EW2.

If the optocoupler circuit of FIG. 3 is implemented in the display circuit of FIG. 1 as the optocoupler circuit OD2, the input pulse signal IS1 corresponds to VS1, the input level signal IS2 corresponds to RO1, the output pulse signal OS1 corresponds to VS2, and the output level signal OS2 corresponds to RO2.

FIGS. 4A and 4B show examples of waveforms which are transferred by the optocoupler. These waveforms may represent the current Id1 or Id2 through the optocoupler diode D1 or D2, respectively, or the current Ic1 or Ic2 through the optocoupler transistor T1 or T2, respectively, or the signals referred to as pulsed signal.

FIG. 4A shows a two-level pulsed signal with a low level 0 indicating the pulse signal IS1, and a high level Le1 which is controlled in accordance with the level signal IS2.

FIG. 4B shows a three-level pulsed signal with a low level Le2 indicating the pulse signal IS1, a fixed high level Le4 flanking the low level Le2, and a level Le3 which is controlled in accordance with the level signal IS2. This three-level signal has the advantage that the pulse detection is possible, even when the controlled level Le3 is equal to or near the low level Le2.

It should be noted that the above-mentioned embodiments illustrate rather than limit the invention, and that those skilled in the art will be able to design many alternative embodiments without departing from the scope of the appended claims. For example, the invention may as well be implemented to transfer signals from the non-line-voltage-insulated part of the display apparatus to the line-voltage-insulated part. The invention is also useful in display apparatuses in which the line voltage insulation is within the line voltage power supply.

The optocoupler circuits shown in FIGS. 2 and 3 are possible embodiments of the invention. For example, the diodes D1, D2 and Fd may be poled in the opposite direction, i.e., the current Is has to flow in the opposite direction too. Depending on the temperature characteristic of the current transfer ratio (CTR) of the optocoupler OC1 or OC2, it is possible to omit the extra diode FD, or to add more than one diode in series with the diode D1 of the optocoupler OC1, the extra diode(s) being poled in the same direction as the diode D1. The impedance Z is now arranged in parallel with the series arrangement of the extra diodes and the diode D. In this way, in combination with the correct value of the impedance Z, it is possible to compensate the change of the CTR of the optocoupler as a function of temperature.

If the optocoupler current Id is applied in a wide range and the change of the CTR as a function of the temperature is not linear, then the impedance Z should vary as a function of the temperature.

In the claims, the term "comprise" and its conjunctions do not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware.

What is claimed is:

1. A display apparatus comprising:
   a non-line-voltage-insulated part;
   a line-voltage-insulated part; and
   an optocoupler circuit for transporting a signal between said non-line-voltage-insulated part and said line-voltage-insulated part, the optocoupler circuit comprising an optocoupler having a light-emitting device and a photosensitive device optically coupled to the light-emitting device, characterized in that the optocoupler circuit comprises
   a pulse generator for supplying a pulse signal having at least two different levels, at least one of said two different levels being controllable, to the light-emitting device; and
   a separation circuit coupled to the photosensitive device for separating an output pulse signal indicating an occurrence of a pulse, and a level signal corresponding to a value of said at least one controllable level.

2. The display apparatus as claimed in claim 1, characterized in that the separation circuit comprises:
   a comparator for comparing an output signal of the photosensitive device with a reference to supply the output pulse signal; and
   an integrator for integrating said output signal to supply the level signal.

3. The display apparatus as claimed in claim 1, characterized in that the line-voltage-insulated part comprises:
   a signal-processing circuit for receiving a video signal;
   the light-emitting device; and
   the pulse generator for receiving an input pulse signal and an input level signal from the signal-processing circuit, and the non-mains-insulated part comprises:
   a deflection circuit for driving a deflection coil of a cathode ray tube;
   the photosensitive device; and
   the separation circuit for supplying the output pulse signal and the level signal.

4. The display apparatus as claimed in claim 3, characterized in that the deflection circuit comprises a frame deflection circuit, the input pulse signal being a frame synchronization signal, and the output pulse signal being supplied to the frame deflection circuit.

5. The display apparatus as claimed in claim 3, characterized in that the deflection circuit comprises a line deflection circuit, the input pulse signal being a line synchronization signal, and the output pulse signal being supplied to the line deflection circuit.

6. The display apparatus as claimed in claim 4 or 5, characterized in that the pulse generator further receives an input level signal from the signal-processing circuitto control the at least one controllable level to obtain the level signal, the input level signal being a controlled DC value or a waveform.

7. The display apparatus as claimed in claim 6, characterized in that the display apparatus further comprises a rotation coil drive circuit for receiving the level signal to drive a rotation coil.

8. The display apparatus as claimed in claim 6, characterized in that the deflection circuit comprises a geometry correction circuit controlled by the level signal.

9. The display apparatus as claimed in claim 1, characterized in that the optocoupler circuit has a transfer characteristic from a current through the light-emitting device to a current through the photosensitive device, said transfer characteristic being temperature dependent, wherein said driver circuit comprises an impedance and a current source for supplying a current to a node, both said light-emitting device and said impedance being arranged between said node and a further node, said impedance having a value for decreasing said temperature dependence of said transfer characteristic.

\* \* \* \* \*